United States Patent [19]
Keverline

[11] 3,929,366
[45] Dec. 30, 1975

[54] COTTON LOADER

[76] Inventor: John J. Keverline, 11242 G & S Ave., Hanford, Calif. 93277

[22] Filed: Aug. 21, 1974

[21] Appl. No.: 499,124

[52] U.S. Cl. ................... 294/88; 214/653; 294/106
[51] Int. Cl.[2] .......................................... B66F 9/20
[58] Field of Search .......................... 214/650–657, 214/147 G, 9; 294/113, 106, 88

[56] References Cited
UNITED STATES PATENTS

| | | | |
|---|---|---|---|
| 782,925 | 2/1905 | Roseberry | 214/9 |
| 3,052,366 | 9/1962 | Duncan | 214/147 G |
| 3,241,695 | 3/1966 | Bishop | 214/653 X |
| 3,427,640 | 2/1969 | Clatterbuck | 214/147 G X |
| 3,797,684 | 3/1974 | Brandt | 214/654 X |

FOREIGN PATENTS OR APPLICATIONS

| | | | |
|---|---|---|---|
| 1,253,803 | 11/1971 | United Kingdom | 214/654 |

*Primary Examiner*—Frank E. Werner
*Attorney, Agent, or Firm*—Jessup & Beecher

[57] ABSTRACT

An attachment is provided for a fork lift, or other type of industrial lift truck, for loading cotton from an elongated cotton rick into a trailer, or the like, for transportation to a cotton gin. The attachment comprises a rear wall formed of a rectangular frame covered with wire mesh, a pair of side walls hinged to the rear wall, and each formed of a rectangular frame covered with wire mesh. A series of forks are attached to the front edge of each of the side walls and extend perpendicularly to the planes of the side walls, to form a forward wall for the assembly. A further series of forks are pivotally attached to the bottom edge of each of the side walls, and these latter forks may be turned to a position in which they extend horizontally to form a bottom for the assembly. The attachment is mounted on the lift truck, and when it is lowered to ground level, the sides may be opened and the rear wall of the attachment moved adjacent the end of a cotton rick. The sides may then be closed so that the forks forming the forward wall may be moved inwardly to intermesh with one another so as to remove the cotton load from the rick, the load being squeezed together by the sides. The attachment may then be raised and suspended over a trailer. The sides may then be opened slightly, and the bottom forks turned downwardly so as to permit the load to be dumped into the trailer.

6 Claims, 7 Drawing Figures

COTTON LOADER

BACKGROUND OF THE INVENTION

Cotton requires about 200 days of sunlight, warm weather and moisture to mature. In the United States, the cotton crop is usually planted in March or April, the cotton plants begin to bloom in June or July, and the crop is usually harvested in August or September. When the raw cotton is harvested it contains seeds, leaf fragments and dirt, and this extraneous matter must be removed from the cotton before it is baled. The cotton lint is separated from the seeds and other extraneous materials in the cotton gin.

The modern cotton gin is an extremely expensive piece of machinery, and when the operation of the gin is keyed to the cotton harvesting period, cotton production is expensive and inefficient. This is because furious activity occurs at the gin during the brief period of the cotton harvest, and the equipment lies idle at other times.

In order to make cotton production more efficient, it has been proposed that the harvested cotton be stored in the cotton fields as elongated ricks, which can be as long as needed. The cotton remains stored in the ricks until scheduled for ginning. The cotton is then loaded from the ricks onto trailers, and it is transported to the gin, as the gin becomes available. In this way the cotton is moved from the field to the gin on a ginning schedule, rather than on a harvesting schedule. This permits continuous ginning over longer periods of time, and it results in a more efficient use of the gin.

The present invention provides a relatively simple, small and inexpensive attachment which may be mounted on any appropriate industrial lift truck, and which permits a single operator efficiently to separate a quantity of cotton from the end of a cotton rick, and to load the cotton into a trailer, or other vehicle, for transportation to the gin.

An advantage of the attachment of the invention, in addition to eliminating the need for five or six persons for the loading operation, as are required when prior art loaders are used, is that it provides a mechanism by which cotton can be loaded easily and efficiently from the rick into the trailer, without any danger of the cotton being blown away, even in the presence of substantial winds.

DETAILED DESCRIPTION OF THE ILLUSTRATED EMBODIMENT

Figure 1:
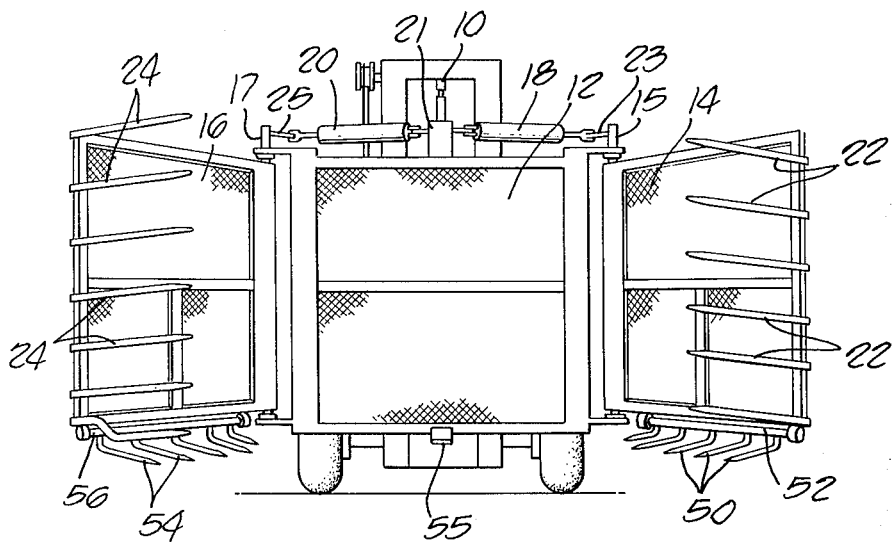
FIG. 1 is a front view of a cotton loading attachment, constructed in accordance with one embodiment of the invention, mounted on a fork lift truck.
Figure 2:
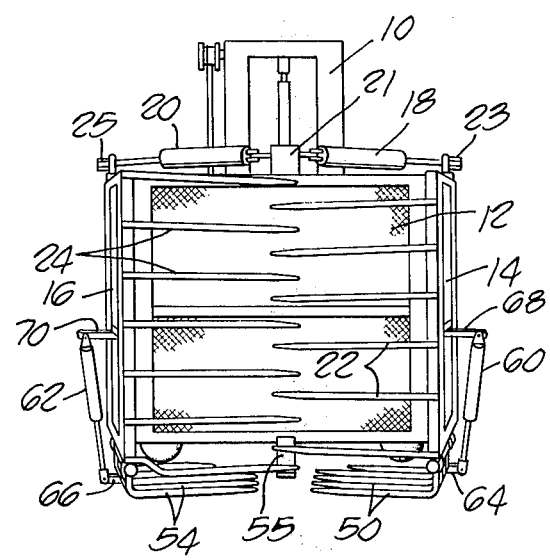
FIG. 2 is a view, like FIG. 1, but with the attachment in a closed condition, whereas the view of FIG. 1 shows the attachment in an open condition.
Figure 3:
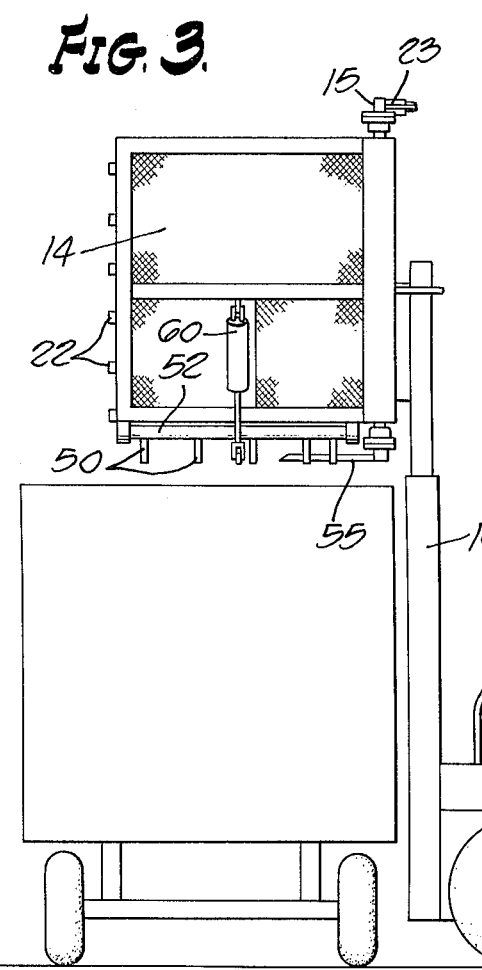
FIG. 3 is a side view of the attachment of FIG. 1, mounted on a lift truck.

As shown in FIGS. 1, 2 and 3 the attachment of the invention in the illustrated embodiment, may be conveniently mounted on an industrial lift truck 10, so that it can be moved at ground level under the end of a cotton rick to separate a load of cotton from the cotton rick. The lift truck 10 also enables the attachment subsequently to be lifted to an elevated position and transported to a trailer, so that its load of cotton may be dumped into the trailer.

The illustrated attachment includes a rear wall 12 which is mounted on the lift truck 10 in transverse relationship, and it also includes a pair of side walls 14 and 16. The side walls 14 and 16 are pivotally coupled to the side edges of the rear wall 12 by means of vertical shafts 15 and 17, and they may be pivotally moved about the axes of the respective shafts by a pair of hydraulic cylinders 18 and 20. The hydraulic cylinders are coupled to a bracket 21 at the top of rear wall 12 and to brackets 23, 25 on the respective shafts. The movement of the side walls by the hydraulic cylinders is between an open position shown in FIG. 1, and a closed position shown in FIG. 2.

Each of the side walls 14 and 16, as well as the end wall 12, are formed of a rectangular frame covered with a wire mesh, or other appropriate material. A first series of elongated forks 22 are attached to the forward edge of the side wall 14, and the forks 22 extend parallel to one another and perpendicular to the plane of the side wall. A similar series of elongated forks 24 are attached to the forward edge of the side 16, and they extend in spaced parallel relationship to one another, perpendicular to the plane of the side wall. The forks 22 and 24, when closed, form the forward end wall of the attachment.

When the side walls 14 and 16 are moved from their open position of FIG. 1 to their closed position of FIG. 2, the forks 22 and 24 enter the cotton rick and separate a load of cotton from the rick. The forks then enter into a intermeshed relationship (shown in FIG. 2) to hold the load in the attachment. At the same time, the side walls 14 and 16 in their closed position serve to squeeze together the load of cotton in the attachment.

Figure 4:
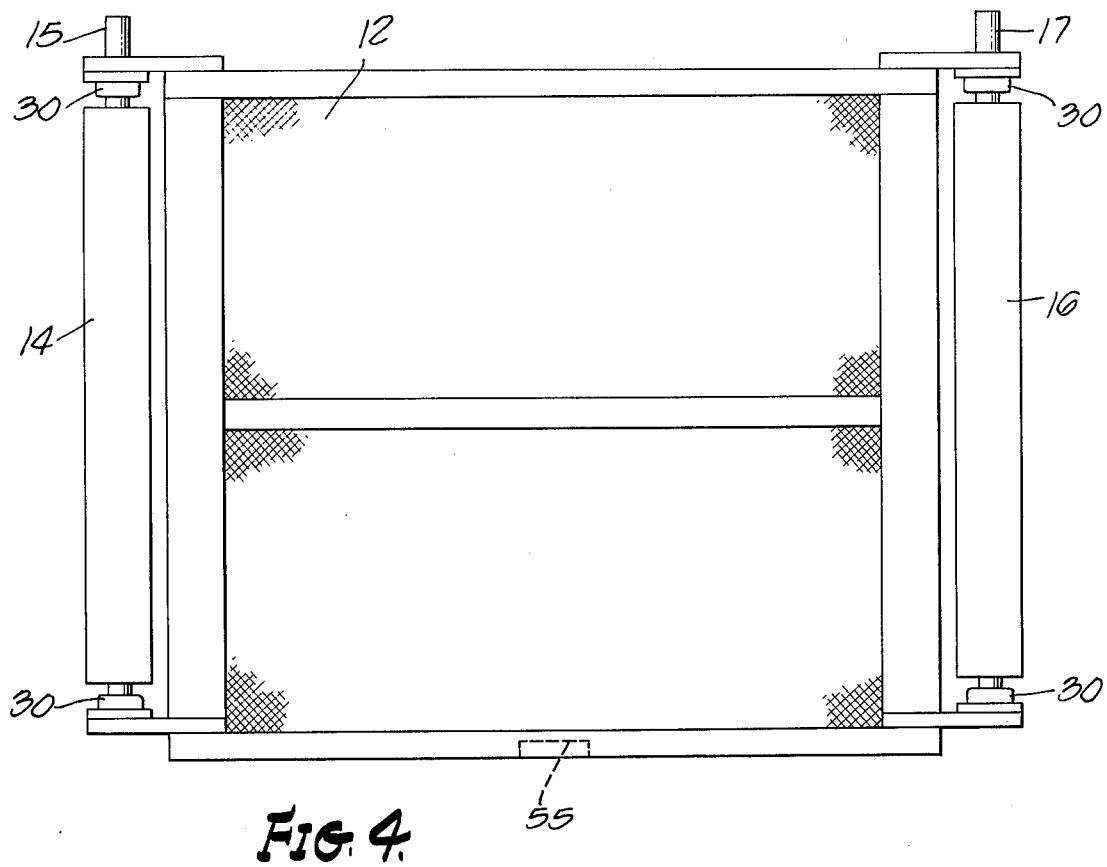
FIG. 4 is a detail of the rear wall of the attachment.
Figure 5:
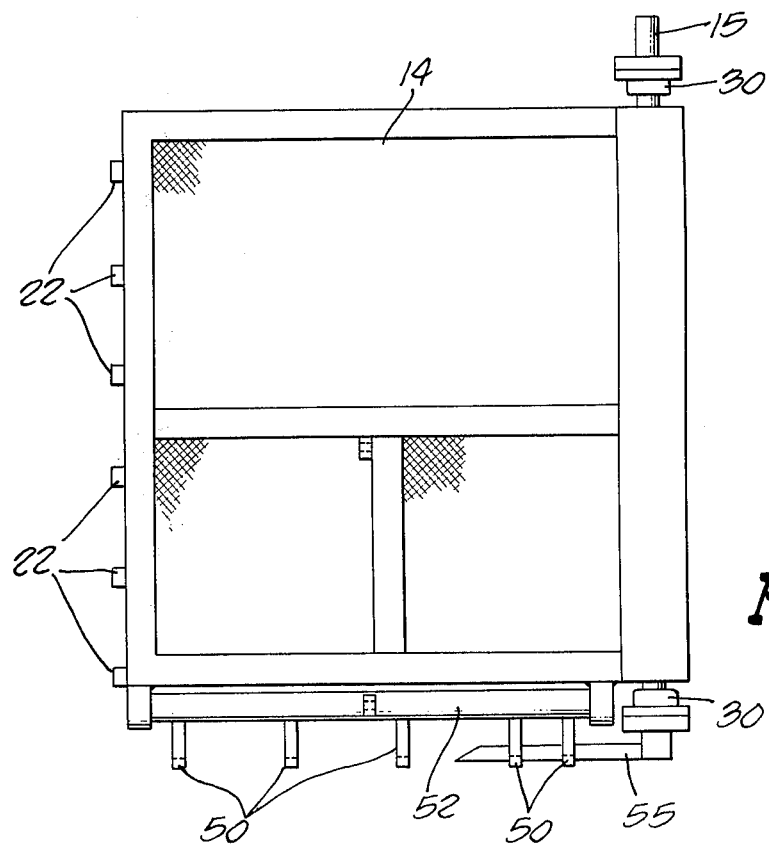
FIG. 5 is a detail of one of the side walls, the other side wall being of a similar construction.

As shown in FIGS. 4 and 5, shafts 15 and 17 are supported in appropriate bearings 30 for pivotal movement about their respective vertical axes. The hydraulic cylinders 18 and 20 are shown at the top of the rear wall in FIGS. 1–3. However, for some purposes it may be appropriate to intercouple the hydraulic cylinders between intermediate brackets, on the rear wall and on the side walls.

Figure 6:
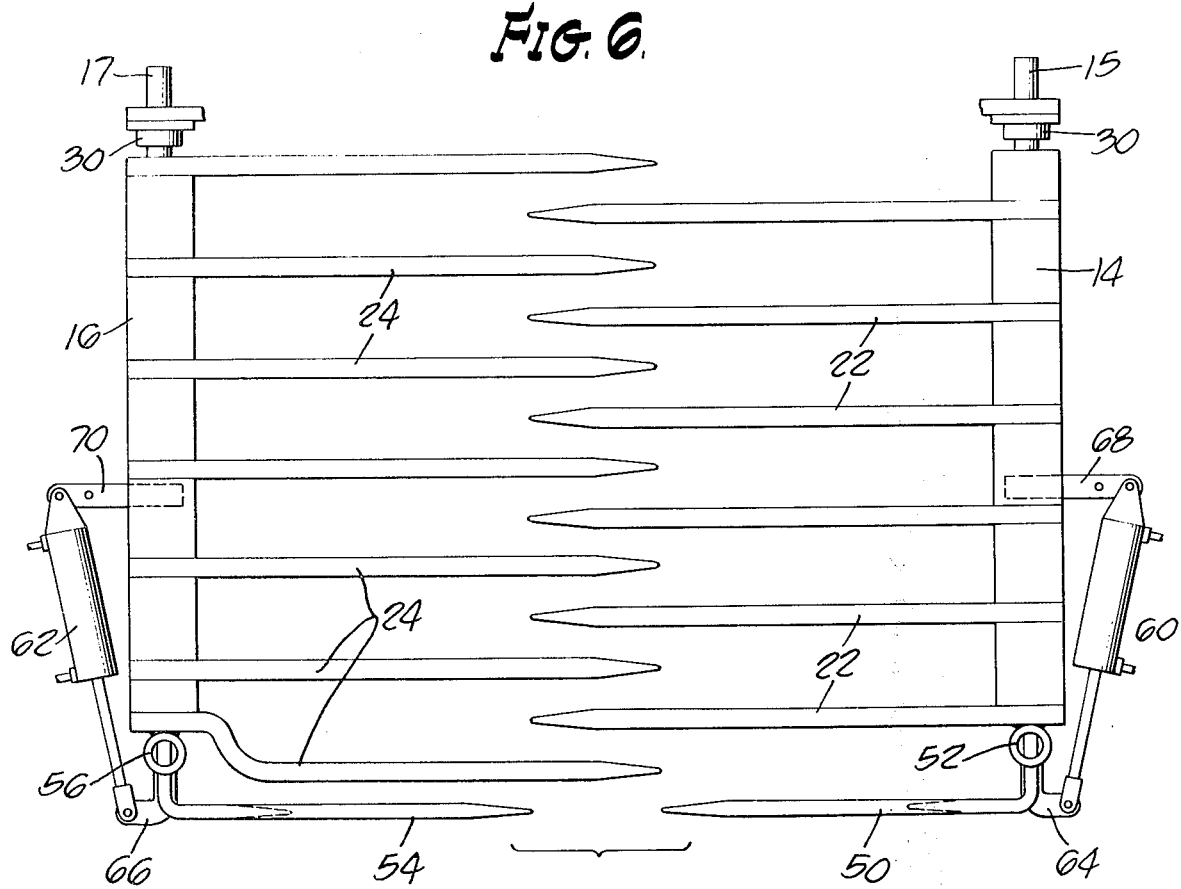
FIG. 6 is a detail of the fork front wall of the attachment.

Each side wall may have the configuration shown in FIG. 5, and the front wall formed by the closed and intermeshed forks 22 and 24 may have the configuration shown in FIG. 6.

Figure 7:
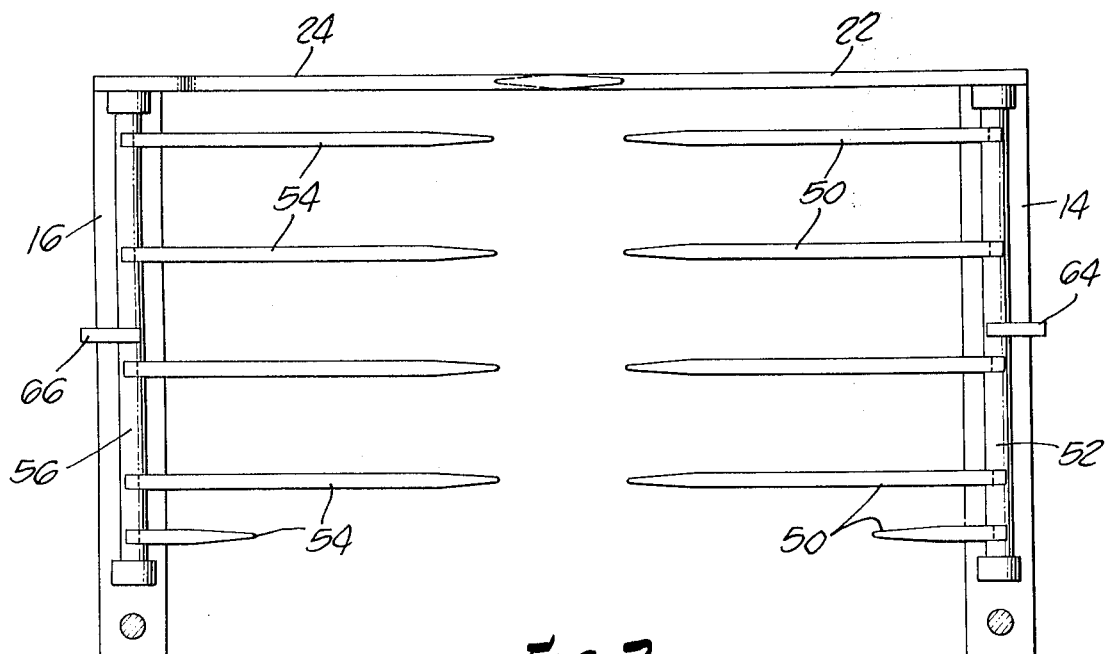
FIG. 7 is a detail of the fork bottom of the attachment.

As also shown in FIGS. 5, 6 and 7, the attachment of the invention has a bottom formed by a first series of forks 50 pivotally mounted to the lower edge of the side wall 14 on a shaft 52, and a second series of forks 54 pivotally mounted to the lower edge of the side wall 16 on a shaft 56. Also, a central fork 55 extends rearwardly from the rear wall 12. As best shown in FIG. 5, openings are provided between the shafts 52, 56 and the lower edges of the sides 14 and 16 to prevent any accumulation of dirt in the attachment.

The bottom forks 54 and 56 are controlled between the closed position of FIGS. 6 and 7, in which the forks are disposed in a horizontal plane, and an open position in which the forks are turned down from the horizontal plane, by means of hydraulic cylinders 60 and 62. The hydraulic cylinders are intercoupled between brackets 64 and 66 respectively mounted on the shafts 52 and 56, on one hand, and brackets 68 and 70 respectively mounted on the sides 14, 16, on the other hand. Adjustments are provided on the brackets 68 and 70, so that the inclination of the forks 50 and 54 may be set for different ground conditions.

The hydraulic cylinders 18, 20 and 60, 62 are controlled by the operator in the lift truck. In operating the equipment, and as explained briefly above, the attachment is first lowered to ground level, and the sides 14 and 16 are opened to the position shown in FIG. 1 by the appropriate operation of the hydraulic cylinders 18, 20 and the bottom forks 50, 54 are placed in the horizontal position shown in FIGS. 6 and 7 by operation of hydraulic cylinders 60, 62. The attachment is then driven against the end of the cotton rick with the central fork 55 being driven under the end of the cotton rick. The hydraulic cylinders 18 and 20 are then operated to close the sides 14, 16 to the position shown in FIG. 2, so that the forks 22, 24 may enter the rick and separate a load from the rick, and so that the sides may squeeze the load together in the rick.

The attachment is then elevated by the lift truck, and the lift truck is used to transport the load to an adjacent trailer, or other vehicle, as shown in FIG. 3. The load is suspended over the trailer, and the hydraulic cylinders 18, 20 are operated to open the side walls slightly, and at the same time, the hydraulic cylinders 60, 62 are operated to turn down the bottom forks 50, 54 so that the load may be dumped into the trailer. During the dumping operation, the load is protected by the side walls and end walls, so that there is no tendency for the cotton to blow away. When the load is released, it rapidly falls into the trailer, the entire operation being carried out by a single operator.

The invention provides, therefore, a simple and inexpensive attachment for an industrial lift truck which permits the lift truck to be used and operated by a single operator to load cotton from a cotton rick into a trailer, for transportation to the cotton gin.

It will be appreciated that although a particular embodiment of the invention has been shown and described, modifications may be made. It is intended in the claims to cover the modifications which come within the true spirit and scope of the invention.

What is claimed is:

1. A loading attachment for an industrial lift truck, or the like, comprising: a rear wall; a pair of side walls hinged to the side edges of the rear wall to be turned about respective vertical pivotal axes between an open and a closed position; a first and second series of elongated fork members mounted in essentially spaced and parallel relationship along the respective forward end edges of the side walls in essentially perpendicular relationship to the planes of the respective side walls, said fork members serving to form a front wall for the attachment when the side walls are in their closed position essentially parallel to one another and perpendicular to the rear wall; and means coupled to the side walls to move the side walls to their open position in which the side walls are turned away from one another about said vertical axes, and to move the side walls to their closed position in which the side walls are turned towards one another to cause the elongated fork members of the first and second series to separate the load, and to cause the side walls to squeeze against the load.

2. The loading attachment defined in claim 1, in which said elongated fork members of the first and second series intermesh with one another when the side walls are in their closed position.

3. The loading attachment defined in claim 1, in which said last-named means comprises a pair of hydraulic cylinders coupled to respective ones of said side walls.

4. The loading attachment defined in claim 1, in which said rear wall and said side walls each comprise a frame covered with a mesh material.

5. The loading attachment defined in claim 1, and which includes a further series of elongated fork members mounted along a lower edge of the attachment to form a bottom for the attachment.

6. The attachment defined in claim 5, in which said further series of fork members are pivotally coupled to the lower edge of the attachment; and means coupled to the further series of fork members to move the same between a closed position in a horizontal plane essentially perpendicular to the planes of the side walls, and an open position in which the load in the attachment may be dumped when the side walls are moved slightly outwardly from their closed positions.

* * * * *